United States Patent Office 3,115,489
Patented Dec. 24, 1963

3,115,489
CYANOCOBALT AND CYANOIRON COMPLEXES OF COBALAMIN
Helmuth Cords, Bakersfield, Dale W. Grant, Wasco, and Earl M. Butterworth, Bakersfield, Calif., assignors to Olin Mathieson Chemical Corporation, New York, N.Y., a corporation of Virginia
No Drawing. Filed June 28, 1960, Ser. No. 39,226
2 Claims. (Cl. 260—211.5)

This invention relates to new compounds having vitamin $B_{12}$ activity. More particularly, this invention relates to certain heavy metal cyanide complexes of cobalamin having important physical and chemical properties.

Cyanocobalamin (vitamin $B_{12}$) is well recognized as a vital nutritional factor in the maintenance of health and as a therapeutic agent in the correction or alleviation of various disorders and diseases. The present invention makes available compounds possessing vitamin $B_{12}$ activity and serving, additionally, as valuable intermediates in the preparation of vitamin $B_{12}$ and its derivatives. In particular, it has been found that the complexes of the present invention exhibit desirable stability, most notably in the presence of acids, thereby providing a means for the formulation of vitamin $B_{12}$ with ingredients normally deleterious to the stability of vitamin $B_{12}$, such, for example, as ascorbic acid.

The novel complexes of the present invention are composed of cobalamin and iron cyanide or cobalt cyanide in the molecular proportions of two molecules of cobalamin to one molecule of heavy metal cyanide ion. The complex of cobalamin and cobalt cyanide, referred to hereinafter as cyanocobalt cobalamin, has the following properties:

LLD ACTIVITY (APPROXIMATELY 55% OF CYANOCOBALAMIN)

| Ultraviolet Spectrum | | Elemental Analysis | |
|---|---|---|---|
| λ, mμ | $E_{1\ cm.}^{1\%}$ | | |
| 273 (sh) | 112 | C | 52.45 |
| 286 (sh) | 93 | H | 6.05 |
| 356 | 136 | N | 12.92 |
| 408 | 17.7 | Co | 6.33 |
| 505 | 37.0 | P | 1.98 |
| 535 | 36.4 | | |

The complex of cobalamin with iron cyanide, hereinafter referred to as cyano-iron cobalamin, is characterized by the following properties:

| Ultraviolet Spectrum | | Elemental Analysis | |
|---|---|---|---|
| λ, mμ | $E_{1\ cm.}^{1\%}$ | | |
| 356 | 164 | C | 54.12 |
| 506 | 51.5 | H | 6.31 |
| 535 | 50.7 | N | 12.72 |
| | | P | 2.12 |
| | | Co | 4.25 |
| | | Fe | 1.98 |

The novel complexes of the present invention are prepared biosynthetically by carrying out a fermentation procedure of the type described in U.S. Patent No. 2,816,856 in the presence of a single or complex cobalt or iron cyanide-containing compound, such as cobaltous cyanide, cobaltous cobaltic cyanide, potassium ferrocyanide, potassium ferricyanide or sodium nitroprusside. The heavy metal cyanide compounds are added in such quantities as will provide a cyanide content in the range of from about 20 to about 170 parts per million. For optimum results, it has been found that the heavy metal cyanide compounds should be added in quantities to provide a cyanide content of 50 parts per million. The addition should be effected at a pH of from about 4 to about 9, and preferably at a pH of 6.0–6.5.

The microorganisms which may be employed in the practice of this invention include those of the genus Propionibacteria which are known to produce vitamin $B_{12}$ in the presence of a vitamin $B_{12}$ precursor (such as 5,6-dimethylbenzimidazole) among which are included *P. arabinosum* (A.T.C.C. 4965), *P. thoenii* (A.T.C.C. 4892), (A.T.C.C. 4871), *P. zeae* (A.T.C.C. 4964), *P. pentosaceum* (A.T.C.C. 4875) and *P. petersonii* (A.T.C.C. 4870); and those which produce vitamin $B_{12}$ without a precursor, such as *P. freudenreichii* (A.T.C.C. 6207) and *P. shermanii* (A.T.C.C. 9614).

The nutrient media useful in the process of this invention include the usual sources of assimilable carbon and nitrogen. As sources of assimilable carbon, there may be used: (1) carbohydrates such as glucose, fructose, xylose, galactose, lactose, and maltose; (2) substances containing carbohydrates such as whey, milk, cornsteep liquor, grain mashes, and molasses; (3) polyhydric alcohols such as glycerol and mannitol; (4) fats, such as lard oil, soybean oil, corn oil, butterfat and cotton seed oil; and (5) fatty acids such as acetic, propionic, pyruvic, stearic palmitic, oleic, and linoleic. Sources of available nitrogen include: (1) organic nitrogen compounds such as proteinaceous materials e.g. casein, urea, soybean meal, fish meal, yeast or yeast products, whey or whey concentrates, amino acids and liver cake; and (2) inorganic compounds such as nitrates or ammonium compounds. The nutrient media should also include metallic cations including cobalt, molybdenum, potassium, sodium, magnesium, iron, copper, manganese, the anions chloride, sulfate, phosphate, and carbonate, and the vitamins, thiamin, niacin, biotin, folic acid, pyridoxine, riboflavin, and p-aminobenzoic acid. These ions and vitamins may be present in the crude materials used in the nutrient medium. In addition, of course, the heavy metal cyanide compounds of this invention are also added as hereinbefore described. The fermentation process may be carried out at temperatures from about 20° C. to about 40° C. and may be operated under aerobic, anaerobic or microaerophillic conditions depending on the microorganism.

If the microorganism produces vitamin $B_{12}$ without the presence of a precursor, none need be added to the broth. If a precursor is necessary it may be added to the fermentation medium either initially, or continuously or intermittently during the incubation period. After a sufficient incubation time (about one to ten days) the fermented medium may be dried and incorporated as a supplement into the feed for animals, such as chickens and pigs, or the cyanocobalamins therein may be recovered in more purified form by usual procedures.

When fermenting with a precursor requiring microorganism, the nature of the precursor employed depends on the physiologically active cobalamin desired. Thus, if vitamin $B_{12}$ is desired, 5,6-dimethylbenzimidazole or another vitamin $B_{12}$ precursor, such as 2,3-dimethyl-5,6-diaminobenzene, 2,3-dinitro-5,6-dimethylbenzene or 2,3-dimethyl-4-amino-5-nitrobenzene, may be used. Thus, as summarized in the following table, the nature of the resulting cobalamin will depend on the precursor chosen. In this table, the symbol Y is that in the formula Y-cobalamin.

| Precursor | Product (Y-cobalamins) | |
|---|---|---|
| | Name | Y is— |
| 5,6-Dimethylbenzimidazole, 2,3-Dimethyl-5,6-diaminobenzene, 2,3-Dinitro-5,6-dimethylbenzene, 2,3-Dimethyl-4-amino-5-nitrobenzene. | 5,6-Dimethyl-benzimidazole-cobalamin. | (5,6-dimethylbenzimidazole structure) |
| Benzimidazole, 1,2-Diaminobenzene, 1,2-Dinitrobenzene, 1-Amino-2-nitrobenzene. | Benzimidazole-cobalamin. | (benzimidazole structure) |
| 2-Nitro-4-trifluoromethylaniline, 5-Trifluoromethyl-benzimidazole, 4-Trifluoromethylphenylenediamine-1,2. | 5-Trifluoromethylbenzimidazole-cobalamin. | (5-trifluoromethylbenzimidazole structure) |
| 5-Methoxy-7-bromo benzimidazole, 3-Bromo-5-methoxyphenylene-diamine-1,2. | 5-Methoxy-7-bromo benzimidazole-cobalamin. | (5-methoxy-7-bromo benzimidazole structure) |
| Quinazoline. | Quinazoline-cobalamin. | (quinazoline structure) |
| 4(3H)-Quinazoline. | 3,4-Dihydro-4-oxoquinazoline-cobalamin. | (3,4-dihydro-4-oxoquinazoline structure) |
| 2,4-Dichloroquinazoline. | 2,4-Dichloroquinazoline-cobalamin. | (2,4-dichloroquinazoline structure) |
| 1-Acetamido-3-methoxyphenazine. | 1-Acetamido-3-methoxyphenazine-cobalamin. | (1-acetamido-3-methoxyphenazine structure) |
| 2-Hydroxyphenazine. | 2-Hydroxyphenazine-cobalamin. | (2-hydroxyphenazine structure) |
| 5-Methylbenzimidazole. | 5-Methylbenzimidazole-cobalamin. | (5-methylbenzimidazole structure) |
| Quinoxaline. | Quinoxaline-cobalamin. | (quinoxaline structure) |
| Benzotriazole. | Benzotriazole-cobalamin. | (benzotriazole structure) |

Alternatively, the novel complexes of this invention can be prepared by the reaction of hydroxo-cobalamin with an appropriate heavy metal cyanide compound. This reaction is generally effected in neutral solution at about room temperature. However, the use of higher temperatures is not precluded, and reactions have been carried out at temperatures up to about 100° C. The reaction period will, of course, depend upon the temperature employed, room temperature reactions taking place over a period of from one to about eighteen hours. At higher temperatures, the reaction time will be correspondingly decreased, periods of about 15 minutes being satisfactory when the temperature approaches the upper limit.

The complexes are readily convertible to cyanocobalamin by treatment with potassium cyanide at either room or elevated temperatures. In addition, cyano-iron cobalamin is easily converted to cyanocobalamin by treatment with sodium hydroxide at pH 9, complete conversion being brought about within one-half hour. The conversion can be effected on the recovered, pure product or it can be carried out on the concentrate obtained from the fermentation broth.

The following examples are illustrative of the practice of this invention:

*Example I*

A medium containing 7.6% beet molasses, 1.5% yeast autolysate solids, 2.0% protein hydrolysate, 1.0% corn steep liquor, 5 p.p.m. cobalt (cobalt sulfite) and 2.0% $CaCO_3$ is dispensed into 1 liter Erlenmeyer flasks at the rate of 500 ml. per flask. Eighty-two milligrams of $Co(CN)_2 \cdot 3H_2O$ (providing a cyanide content of 50 p.p.m.) are then added to the medium and the supplemented medium is then sterilized by autoclaving at 121° C. for 20 minutes. After cooling, the flasks are inoculated with an active vegetative culture of *P. freudenreichii* (ATCC 6207) and incubated at 30° C. on a slow rotary shaker for 96 hours. The pH is adjusted to 7.0–8.0 twice daily with sterile NaOH. The progress of the fermentation is followed by periodic tests for residual sugar, and contamination is checked by conventional plating methods.

At the conclusion of fermentation, the bacterial cells are harvested by centrifugation and the resulting cell cream extracted with an equal volume of acetone at room temperature for 20 minutes. The acetone extract is evaporated to $\frac{1}{10}$ of its original volume, washed with chloroform and then extracted with phenol-benzene (30–70%). One-half volume acetone is added to the phenol-benzene and this mixture extracted with a small volume of distilled water. After washing the distilled water with an equal volume of chloroform, the volume is reduced to 0.2–0.5 ml.

An aliquot of this rich aqueous concentrate is taken for potency determination after which 100–200 micrograms of pigment were applied to Whatman No. 3MM filter paper. 27 cm. of this paper is exposed to electrophoresis in a 2 N acetic acid for 16 hours at 280 volts. Examination of the resulting electropherogram shows that the cyanocobalt cobalamin represents about 90% of the total cobalamin pigments.

*Example II*

A medium containing 4% clintose, 1.5% yeast autolysate solids, 2.0% protein hydrolysate, 1.0% corn steep liquor and 2.0% CaCO₃, is inoculated with an active vegetative culture of *P. freudenreichii* (ATCC 6207). Thirty-five milligrams of Co(CN)₂·3H₂O (providing a cyanide content of 50 p.p.m.) are added to the medium and sterilization annd fermentation are then carried out as in Example I. As in Example I, the cyanocobalt cobalamin represents about 90% of the total cobalamin pigments.

*Example III*

Ten gallons of a medium containing 5.4% beet molasses, 2.4% cane molasses, 1.5% corn steep liquor, 2% protein hydrolysate 0.5% yeast autolysate solids and 5 p.p.m. cobalt (cobalt sulfate) is dispensed into a fermentation tank and sterilized for 15 minutes at 120° C. The sterilized medium is inoculated with 2 liters of a vegetative inoculum of *P. freudenreichii* (ATCC 6207) and fermentation is allowed to proceed for 110 hours at 30° C. using mild aeration of 0.25–0.55 cubic feet per minute of air. The pH of the medium is controlled during fermentation between 6.0 and 6.6. Cobaltous cyanide Co(CN)₂·3H₂O is added intermittently during the fermentation at a level providing a total cyanide content addition of 170 p.p.m. The electrophoresis method described in Example I shows that the cyanocobalt cobalamin represents about 95% of the total cobalamin pigments.

*Example IV*

Following the procedure of Example I, but substituting K₄Fe(CN)₆·3H₂O for CO(CN)₂·3H₂O there is obtained the corresponding complex cobalamin and iron cyanide (cyano-iron cobalamin).

*Example V*

153 mg. of crystalline hydroxocobalamin is added to 25 cc. of an aqueous solution containing 300 mg. of cobaltous cyanide. The solution is allowed to stand for 16 hours at room temperature and then extracted with 12 cc. of 88% (aqueous) phenol. The resulting organic phase is separated and washed three times with 10 cc. portions of water, each of which contains 3.2% phenol. To the phenol layer, there is added 24 cc. of benzene, 35 cc. of acetone and 5 cc. of water. The resulting aqueous phase is separated, washed with three 5 cc. portions of chloroform and then lyophilized. The resulting amorphous residue is purified by continuous paper electrophoresis in 2 N acetic acid at 280 volts. The fractions containing the cyano-cobalt cobalamin are combined, extracted with 10 cc. of phenol and the phenol extract washed with three 10 cc. portions of water, each containing 3.2% phenol. To the phenol layer, there is added 24 cc. of benzene, 35 cc. of acetone and 5 cc. of water. The resulting aqueous phase is separated, washed with three 5 cc. portions of chloroform and then lyophilized. The resulting amorphous product is cyanocobalt cobalamin, identical with the product obtained according to the procedure of Example I.

*Example VI*

To 25 cc. of water containing 300 mg. of potassium ferrocyanide trihydrate, there is added 152 mg. of crystalline hydroxocobalamin. The resulting solution is allowed to stand for 16 hours at room temperature, and the product is then isolated and purified by following the procedure detailed in Example V. The product obtained is cyano-iron cobalamin, identical with the product obtained according to Example IV.

*Example VII*

To 25 cc. of water containing 300 mg. of sodium nitroprusside, there is added 152 mg. of crystalline hydroxocobalamin. The resulting solution is allowed to stand for 16 hours at room temperature, and the product is then isolated and purified by following the procedure detailed in Example V. The product exhibits an additional maximum at 5.23μ, characteristic of the nitroso group.

The invention may be variously otherwise embodied within the scope of the appended claims.

What is claimed is:

1. Cyanocobalt cobalamin, a complex of cobalamin and cobalt cyanide in the molecular proportion of two molecules of cobalamin to one molecule of cobalt cyanide ion, said complex having an ultraviolet spectrum containing peaks at the following wavelengths: 273, 286, 356, 408, 505, 535 millimicrons, and an elemental analysis of carbon, 52.45%; hydrogen, 6.05%; nitrogen, 12.92%; cobalt, 6.33%, and phosphorus, 1.98%.

2. Cyanoiron cobalamin, a complex of cobalamin and iron cyanide in the molecular proportion of two molecules of cobalamin to one molecule of iron cyanide ion, said complex having an ultraviolet spectrum containing peaks at the following wavelengths: 356, 506 and 535 millimicrons, and an elemental analysis of carbon, 54.12%; hydrogen, 6.31%, nitrogen, 12.72%, cobalt, 4.25%, iron, 1.98%, and phosphorus, 2.12%.

References Cited in the file of this patent

UNITED STATES PATENTS

| | | |
|---|---|---|
| 2,650,896 | McDaniel et al. | Sept. 1, 1953 |
| 2,874,089 | Zuck | Feb. 17, 1959 |
| 2,879,203 | Barthelemy et al. | Mar. 24, 1959 |
| 2,971,891 | Cords et al. | Feb. 14, 1961 |